US012654438B2

(12) United States Patent
Pfeiffer

(10) Patent No.: US 12,654,438 B2
(45) Date of Patent: Jun. 16, 2026

(54) METHOD FOR PROCESSING DECORATIVE PAPER

(71) Applicant: SWISS KRONO TEC AG, Lucerne (CH)

(72) Inventor: Sabrina Pfeiffer, Kyritz (DE)

(73) Assignee: SWISS KRONO TEC AG, Lucerne (CH)

( * ) Notice: Subject to any disclaimer, the term of this patent is extended or adjusted under 35 U.S.C. 154(b) by 212 days.

(21) Appl. No.: 18/569,510

(22) PCT Filed: Jun. 23, 2022

(86) PCT No.: PCT/EP2022/067092
§ 371 (c)(1),
(2) Date: Dec. 12, 2023

(87) PCT Pub. No.: WO2022/268921
PCT Pub. Date: Dec. 29, 2022

(65) Prior Publication Data
US 2024/0269977 A1 Aug. 15, 2024

(30) Foreign Application Priority Data
Jun. 24, 2021 (EP) ..................................... 21181388

(51) Int. Cl.
*B41F 33/00* (2006.01)
*G01N 21/88* (2006.01)
*G01N 21/956* (2006.01)
(52) U.S. Cl.
CPC ..... *B41F 33/0036* (2013.01); *G01N 21/8806* (2013.01); *G01N 21/95607* (2013.01)

(58) Field of Classification Search
None
See application file for complete search history.

(56) References Cited

U.S. PATENT DOCUMENTS

| 8,467,592 B2 | 6/2013 | Wang et al. | |
| 2012/0105860 A1* | 5/2012 | Jaschul | G01J 3/0254 |
| | | | 356/456 |

(Continued)

FOREIGN PATENT DOCUMENTS

| DE | 100 23 127 A1 | 11/2001 |
| EP | 2131243 A2 | 12/2009 |

(Continued)

OTHER PUBLICATIONS

International Search Report issued on Nov. 30, 2022 in corresponding Application No. PCT/EP2022/067092; 13 pages.

(Continued)

*Primary Examiner* — Darryl V Dottin
(74) *Attorney, Agent, or Firm* — Andrew M. Calderon; Calderon Safran & Wright P.C.

(57) ABSTRACT

The disclosure relates to a method for detecting deviations of extension of decorations on printed decorative papers, the method includes the following steps: providing the printed decorative paper on a sample table, projecting a target pattern onto the sample table and the printed decorative paper such that a distance between two predetermined pattern elements of the projected target pattern corresponds to a target distance between at least two predetermined decorative elements of the decoration, determining deviations between the actual distance of the decorative elements and the distance between the projected pattern elements.

19 Claims, 2 Drawing Sheets

(56)  References Cited

U.S. PATENT DOCUMENTS

| | | | |
|---|---|---|---|
| 2013/0295352 | A1 | 11/2013 | Thiers et al. |
| 2015/0377606 | A1 | 12/2015 | Thielemans |
| 2016/0347085 | A1* | 12/2016 | Cloots .................. H04N 1/3872 |
| 2016/0375718 | A1* | 12/2016 | Van Garsse ........... G06F 3/1251 |
| | | | 52/311.1 |
| 2018/0278905 | A1* | 9/2018 | Nakazawa ........... H04N 9/3194 |
| 2020/0005104 | A1 | 1/2020 | Fujimaki et al. |

FOREIGN PATENT DOCUMENTS

| | | | |
|---|---|---|---|
| EP | 2318211 | B1 | 11/2016 |
| JP | 1172313 | A | 3/1999 |

OTHER PUBLICATIONS

Foreign Office Action dated Dec. 25, 2025 in CN Application No. 202280044049, 22 pages.
Foreign Office Action dated May 9, 2026 in CN Application No. 202280044049.X, 15 pages.

* cited by examiner

METHOD FOR PROCESSING DECORATIVE PAPER

FIELD ON INVENTION

The invention relates to a method for detecting deviations of extension of decorations on printed decorative papers. The invention also relates to a method for producing decorative paper with a decoration as well as a method for processing a printed decorative paper, in each case using a method for detecting the deviations of extension. Finally, the invention also relates to a device for conducting one of the named methods.

BACKGROUND

When printing decorative papers, deviations of extension of the printed paper may occur for a variety of reasons. In particular, when liquids are applied to the paper, as is the case during printing, for example, it may cause paper growth, the extent of the growth depending, for example, on the amount of the liquid applied. If this is spatially different and not homogeneous in a decoration, for example, this generally also applies to the expected paper growth. Not only applied liquids, but also, for example, the humidity in the room in which the printing occurs, the temperature and parameters of the base paper used, can influence the dimensions and extensions of the decorative paper. The same applies to the processes and work steps that occur before the actual printing process, such as applying a primer coat, also referred to as a primer, and to processes that occur after the actual printing process, such as impregnating the printed decorative paper.

If the printed decorative papers are processed in further work steps, it is, however, particularly important that predetermined dimensions and extensions of the respective decorative paper are observed. For example, if the printed decorative paper is applied and laminated onto a solid body, such as a wood-based material panel, from which individual boards are cut or sawn in a later work step, it is necessary for the decorative paper, which is then arranged on each individual board, to correspond to the target image. Such boards are often provided with a structure in the surface that is designed to be congruent with the decoration, reproducing, for example, the haptic impression of a wooden panel. If the extension and dimensions of the decoration do not align with the target values, the imprinted structure cannot follow the lines of the decoration and the illusion cannot work.

The problem has long been known in the prior art and various methods and measures have been suggested to tackle the issue. On the one hand, this concerns measures such as drying steps and moisture monitoring using sensors, which are used to adjust the result of the printing process as effectively as possible to the target values, thereby ensuring that any deviations of extension are as small as possible. Nevertheless, it is advantageous and necessary to check the result and to be able to detect deviations of extension. A method for this is known from EP 2 318 211 B1 in which, for example, the width or length of the decoration is measured and compared with target values.

The disadvantage is that such a method is complex and therefore usually cannot take place in the regular printing process, as this would require too high a speed. The invention therefore aims to propose a method for detecting deviations of extension that can be performed with speed and certainty.

SUMMARY

The invention solves the addressed task by way of a method for detecting deviations of extension of decorations on printed decorative papers, the method comprising the following steps:

providing the printed decorative paper on a sample table, projecting a target pattern onto the sample table and the printed decorative paper such that a distance between two predetermined pattern elements of the projected target pattern corresponds to a target distance between at least two predetermined decorative elements of the decoration, determining deviations between the actual distance of the decorative elements and the distance between the projected pattern elements.

The printed decorative paper is thus initially provided and arranged on a sample table. This does not necessarily have to be a separate table or a separate work surface, but can be any surface on which the method is to be carried out. The printed decorative paper is preferably arranged on this sample table so that it does not move relative to said sample table. This is advantageous, but not absolutely essential. It is also conceivable to perform the method without the decorative paper coming to rest. However, this increases the amount of equipment required.

A target pattern is now projected onto the sample table with the printed decorative paper located on it. This means that the decorative paper on the sample table is illuminated in a certain way. This lighting, i.e. the projection of the target pattern, features multiple pattern elements. For example, these may be image elements of the decoration, lines or dots. In principle, all elements of the target pattern are to be referred to as pattern elements in the context of the invention described here. The distance between the projections of these pattern elements depends on the distance of the projector, i.e. the source of the projection, and the decorative paper on the sample table. The geometric relationship is known. It is therefore possible to arrange the projector, from which the target pattern is projected, so far from the sample table and a decorative paper on it that the distance between the projection of two pattern elements on the printed decorative paper corresponds to the target distance required and expected between two likewise predetermined decorative elements of the decoration.

The projection of the at least two predetermined pattern elements now renders it very easy to check whether the distance between these two projections of the pattern elements and the two predetermined decorative elements match or whether there is a deviation and how large it is. This occurs in the final step in the method in that the deviation is between the actual distance of the decorative elements and the distance between the projections of the pattern elements, i.e. the projected pattern elements.

Preferably, a target distance corresponds to the target width of the decoration and/or a target distance to the target length of the decoration. In this way, it is determined in the final step in the method the extent to which the overall width and/or the overall length of the decoration differ from the respective target values. Particularly preferably, the target distance corresponds to the target width of individual boards of the decoration. It is therefore possible to determine the area of the decoration in which an especially large and/or especially small growth has occurred or where other deviations arise. In a preferred embodiment, at least one pattern element, preferably a straight line, is projected between every two adjacent panels represented by the decoration. The target positions of the "joints" between adjacent panels are thus represented and it can be identified and confirmed in a spatially resolved manner where the deviations have occurred.

Advantageously, the pattern elements contain lines that are projected onto the decorative paper as light lines. These lines preferably extend parallel to each other in pairs, so that a distance between the two lines, i.e. the projected pattern elements, is especially easy to determine. For example, if the pattern elements feature lines whose distance in the projection, i.e. on the decorative paper, corresponds to the target width of the decoration, the final step in the method need only determine whether and, if so, how far the actual printed decoration protrudes beyond these two lines or how great the distance is between the actual printed line decoration and the two lines. In the first case, the decoration is wider than desired; in the second case, it is narrower.

Regardless of which pattern elements are used, it is advantageous to align the printed decorative paper on the sample table. Here, an alignment of the decorative paper relative to the projection of the target pattern is particularly important. In an especially advantageous embodiment, the decoration has a centreline which, particularly preferably, extends in the longitudinal direction. It has been proven especially advantageous if the target pattern also comprises such a centreline, so that the two centrelines only have to be brought to coincide with one another to ensure the best possible alignment.

The target pattern preferably includes at least one part of the decoration, but preferably the entire decoration. For example, it is possible that the target pattern includes the part of the decoration printed with one of the various printing colours. For example, they can be lines printed in a particular colour, preferably black. These lines may, but do not necessarily have to, extend parallel to each other. Said lines of the target pattern, which are also visible as lines in the projection, preferably align with the corresponding lines of the decoration when the latter has the optimal dimensions. These lines preferably extend across as large a part of the decoration as possible, preferably across the entire decoration. It is therefore possible to determine deviations in the extension of the decoration at many different points of the decoration and as such, not only to identify whether the entire width or the entire length of the decoration aligns with the predetermined target values, but to determine a spatially-resolved and thus spatially-dependent deviation in the extensions.

Particularly preferably, the printed decorative paper and the projected target pattern is captured by an optical sensor. This may be a digital camera, for example, which preferably detects visible light, infrared radiation and/or UV radiation. The camera image captured in this way, which is also referred to as a detected value, is then transmitted to an electronic data processing device, which is then able to determine the required deviations, for example using image processing software.

Projecting a target pattern also refers in particular to illuminating the decorative paper provided on the sample table, as can be achieved using lasers, for example.

The invention also solves the addressed task by way of a method for producing decorative paper with a decoration, the method comprising the following steps:

providing an unprinted base paper,

printing a decoration onto the base paper, detecting deviations in extension of the printed decoration by means of a method of the type described here, determining at least one corrective measure if the detected deviation is greater than a predetermined limit value, and implementing the at least one corrective measure and repeating the steps in the method.

Once the decoration has been printed onto the base paper, a deviation in the extensions of the printed decoration from the required target values is determined. If the deviation is greater than a predetermined limit value, at least one corrective measure is defined. Preferably, this can also be done by the electronic data processing device. For example, it is possible to reduce or increase the moisture content of the base paper by, for example, controlling a dryer provided in the printing process accordingly and increasing or reducing the drying power. The paper growth can thus be controlled and influenced. This is especially advantageous if, as described above, a spatially-dependent deviation is determined and a dryer is able to dry different areas of the base paper to different extents before and/or after printing a decoration onto it.

The defined corrective measure is then implemented. For example, it means that production parameters in the printing process, for example at individual workstations within the printing line, such as an application unit for a primer coat, a dryer or a digital printing unit, can be altered. The steps in the method are subsequently repeated and a new base paper is provided with a decoration. This ensures the most consistent quality possible of the decorative paper to be produced.

The invention also solves the addressed task by way of a method for processing a printed decorative paper, the method comprising the following steps:

providing a decorative paper onto which a decoration is printed, detecting deviations of extension of the printed decoration by means of a method of the type described here, and processing the printed decorative paper in at least one further work step, depending on the detected deviations of extension.

In this method, the detected deviations in extension are consequently not used to achieve a better result with a next decorative paper, but to be able to further process the printed decorative paper, the deviations of extension of which have been determined and detected, as effectively as possible in subsequent work steps.

Preferably, the at least one further work step is selected depending on the detected deviations. It is thus possible, for example, that the deviation is so great that an additional work step must initially be conducted before the actual intended further processing of the printed decorative paper is possible. For example, if the printed decorative paper is glued or laminated onto a solid object, such as a wood-based material panel, the dimensions, i.e. the extension of the decorative paper, must lie within a tolerance range. Due to the additional work step, which has been selected depending on the detected deviations, a better result can be achieved.

Alternatively or additionally, working parameters, which are used in a further work step, are selected depending on the detected deviations. This is also advantageous when no additional work step is introduced, which is required due to a large or small deviation of extension of the decoration from the target value.

Of course, a method described here for producing decorative papers can be advantageously combined with a method described here for processing a printed decorative paper. It is of course not necessary to carry out the respective method for detecting deviations of extension twice. Instead, the detected deviations of extension can be used on the one hand to reduce the deviations in the next decorative paper to be produced and, on the other, to be able to further process the previously printed decorative paper as effectively and precisely as possible in subsequent work steps.

The invention also solves the addressed task by way of a device for carrying out a method described here, the device comprising at least one sample table and at least one projector for projecting the target pattern onto the sample table. Such a device can be used, for example, to conduct an input inspection in which printed decorative papers are checked for deviations before being fed to a further step in the method. Such a step in the method constitutes, for example, pressing in a press, such as a short-cycle press, in which an impregnated decorative paper is applied to a carrier plate, such as a wood-based material panel. However, a device according to the invention can also be used between two work steps, for example printing and packaging for onward transport.

The device preferably has at least one optical sensor, especially preferably at least one camera, which is configured to detect a target pattern projected onto the sample table and at least one part of the decoration of a decorative paper on the sample table. Preferably, the optical sensor is configured to detect electromagnetic radiation, especially preferably visible light.

In a preferred embodiment, the device has an electric control unit, especially preferably an electronic data processing device, which is configured to evaluate the data captured by the at least one optical sensor, especially preferably the camera, and to determine the deviations.

The electric control unit is preferably configured to emit a signal, particularly an optical and/or acoustic signal, when the determined deviations exceed a predetermined dimension.

Preferably, the electric control unit is configured to display the determined deviations on a display device, to store them in an electronic memory and/or to transmit them to another electric control unit. If the information is displayed, for example on a display, a processor or user of the device can collect and process the information, for instance by adjusting production parameters of an upstream or downstream functional unit to the deviations.

Preferably, the at least one projector is arranged in such a way that it projects the target pattern in a direction perpendicular to the sample table. Particularly preferably, the at least one projector is arranged such that it can be displaced relative to the sample table, preferably perpendicular to the sample table. The sample table and/or the projector can preferably be moved perpendicular and/or parallel and/or in at least one other direction relative to one another.

In a first embodiment example, such a device is installed in a printing hall, in which a digital printing process is carried out to produce decorative papers with a decoration. Following the actual printing process, a repeat pattern, i.e. a decorative paper with a decoration, is extracted and aligned on a table that forms the sample table. The projector situated above it generates an image with the target values for the dimensions on the printed decoration with the actual dimensions. The sample, i.e. the extracted repeat pattern and the image generated in this manner, are aligned using the centre line. The centre line is preferably contained in both the repeat pattern and the target pattern. An employee or an electronic data processing device recognises that a deviation will occur that is greater than a predetermined limit value. At least one operating parameter of the system, such as a drying temperature or a web tension of the paper web of the base paper to be printed, is then adjusted until the result improves and the deviations are smaller than the predetermined limit value. In a preferred embodiment, it is also possible to carry out the method directly in the digital printing facility if, for example, lasers are used when projecting the target pattern onto the sample table. In this case, it is advantageous if they only project the width of the decoration, i.e. the entire width of the decoration, so it can be purely visually assessed whether the dimensions align.

Particularly preferably, the decoration features representations of multiple boards, which can also be referred to as panels. Between these representations, the decorative paper printed with the decoration is cut, preferably sawn, for example after it has been applied to a carrier plate. As material is usually lost in the process, for example due to the thickness of the saw blade used, the decoration has lines at these points along which the cuts are made. Preferably, pattern elements are projected onto the decorative paper along these lines. This allows for spatially-dependent deviations to be determined, so that it can be determined in which area of which panels the deviation is especially large or especially small. The direction can be determined in which a deviation is particularly large. For example, if the decorative paper moves as so-called endless paper from a roll through the printing machine, too high a tension can lead to an especially large growth of the paper and therefore also the decoration in this direction.

In another embodiment example, the device is installed in an impregnation hall. In this hall, the printed decorative paper is impregnated with a synthetic resin, for example. In this case, a repeat pattern is extracted prior to impregnation and a check is performed to see whether the correct dimensions have been achieved after printing. This means that the system can be adjusted before impregnation in the event of deviations. Alternatively or additionally, a repeat pattern can also be extracted after the impregnation process and, for example, aligned on a table with a fixed end stop. The projector situated above it generates an image with the target dimensions on the printed decoration with the actual dimensions. The employee or an electronic data processing device recognises that a deviation will occur and can adjust at least one operating parameter of the system (drying temperature, web tension) if the deviation is greater than a predetermined limit value.

In another embodiment example, the device is installed in an incoming inspection facility. When the impregnated sheets, i.e. the decorative paper printed with a decoration, are delivered to the respective unit, an incoming inspection can be conducted by also extracting a repeat pattern here, and a target/actual comparison is conducted on a measuring table by projecting the target image onto the actual sample. As such, it can already be decided at this point whether the goods will be accepted or a complaint will be made.

A further embodiment example intends for a corresponding device to be arranged on a press, in which a printed decorative paper, which is preferably impregnated, is pressed with a core of a wood-based material panel, for example. A repeat pattern is measured before production begins. This allows deviations in the extension of the repeat pattern to be detected, which can be caused, for example, by absorbing or giving off moisture. Preferably, a repeat pattern can also be extracted after pressing in order to check whether the deviations in extension are still smaller than a predetermined limit value. If this is not the case, readjustments can be made in the system, for example by amending and adjusting the alignment and/or the pressure, so as to ensure as effective a utilisation as possible. If the deviations are too great, production can also be stopped in good time in order to save resources.

In another embodiment example, the device is installed in a flooring facility, where the pressed panels are sawn into individual boards. A panel can be inspected beforehand to determine whether the dimensions have been observed. In the event of deviations, a decision can be taken as to whether further processing should be stopped or as many saleable floorboards as possible are still to be obtained using a different cutting pattern. For example, a board that does not fit in a central area of the panel could be discarded if it is then sawn differently so that the adjoining board fits again.

BRIEF DESCRIPTION OF DRAWING

In the following, a number of embodiment examples of the invention will be explained in more detail with the aid of the accompanying figures. The drawings show.

DETAILED DESCRIPTION

Figure 1:
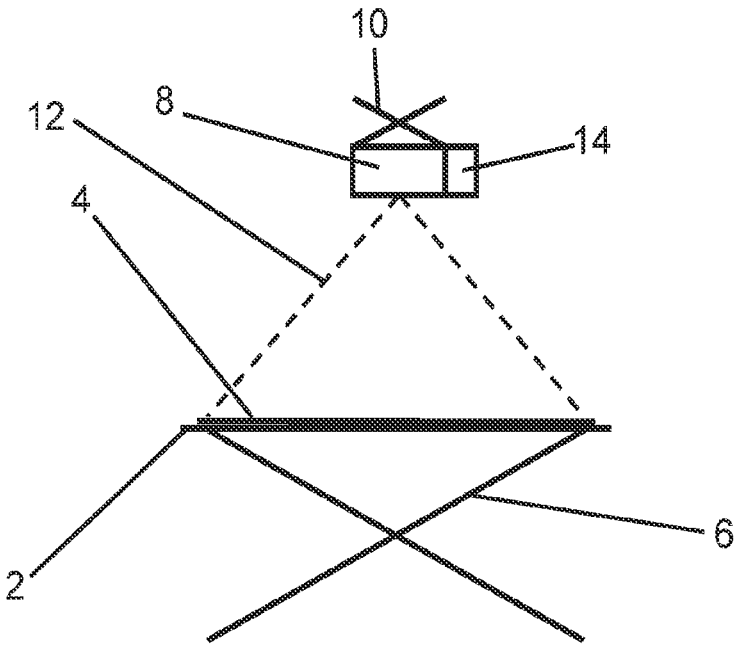
FIG. 1 sows a schematic representation of a device according to an embodiment example of the present invention and FIGS. 2 to 4 show schematic representations of various methods.

FIG. 1 schematically depicts a device according to a first embodiment example of the present invention. It has a sample table 2 on which a decorative paper is arranged 4. The sample table 2 has a height adjuster 6, which is depicted only schematically. A projector 8 is arranged above the sample table 2, the former having a second height adjuster 10. Via this height adjuster 10, the projector 8 is fixed, for example, to a mount of the device or the ceiling of a production hall. However, both the height adjuster 10 and the projector 8 preferably constitute part of the device. In particular, given that both the sample table 2 and the projector 8 each comprise a height adjuster 6, 10, a distance between the decorative paper 4 and the projector 8 can be precisely adjusted.

The projector 8 projects a target pattern along the schematically depicted beam cone 12 onto the decorative paper 4. In the embodiment example shown, a camera 14 is arranged on the projector 8 that is configured to detect the decorative paper 4 and the target pattern projected onto the decorative paper 4 by the projector 8 and to feed these to an electric control unit.

Figure 2:
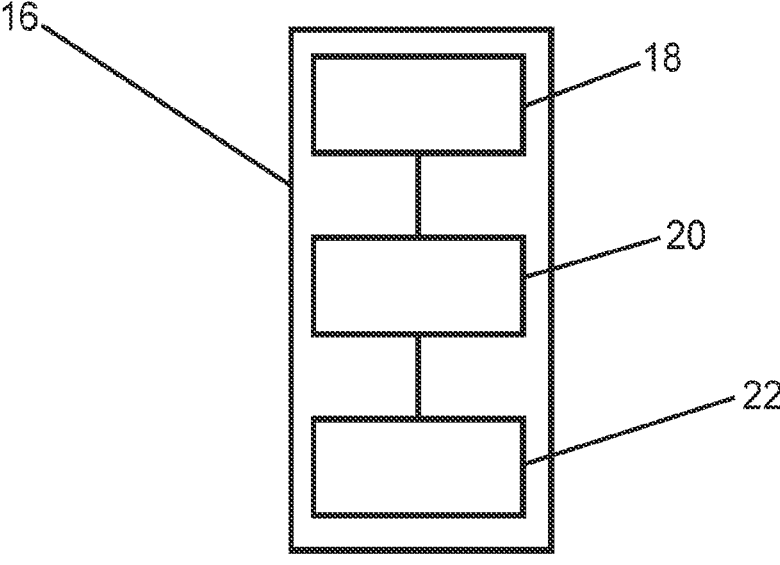

FIG. 2 schematically depicts a method for detecting deviations of extension 16. A first work step comprises supplying 18 the printed decorative paper 4 on the sample table 2. This is followed in a further work step by projecting 20 the target pattern onto the sample table 2 and the printed decorative paper 4. A distance between two elements of the target pattern, the so-called pattern elements, corresponds to a target distance between two predetermined decorative elements of the decoration printed onto the printed decorative paper 4. For example, once both the target pattern and the decoration of the decorative paper 4 have been detected by means of the camera 14, deviations are determined 22 in a subsequent work step.

Figure 3:
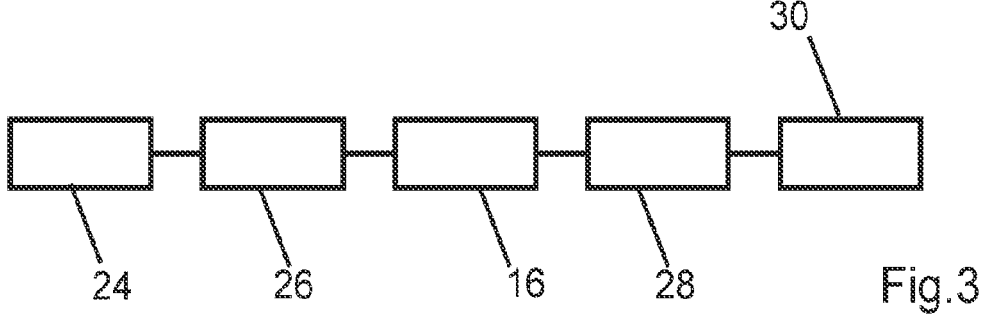

FIG. 3 shows a method for producing decorative papers 4. A first work step consists of providing 24 an unprinted base paper. The unprinted base paper is then printed onto 26, before the method for detecting deviations of extension 16 is conducted, as shown in FIG. 2, for example. This is followed by determining 28 and implementing 30 at least one corrective measure.

Figure 4:
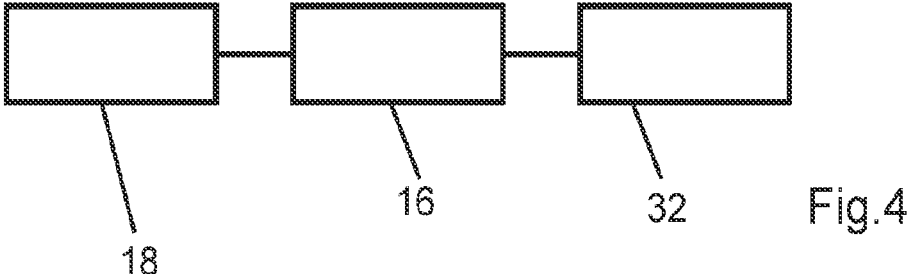

FIG. 4 illustrates a further method in which now printed decorative papers 4 are processed. The first work step again constitutes the provision 18 of a printed decorative paper 4, before the method for detecting deviations of extension 16 is again carried out. Once the deviations have been determined and potential corrective measures carried out, the printed decorative paper 4 is fed to processing 23 in at least one further work step.

The invention claimed is:

1. A method for producing decorative papers with a decoration, the method comprising:

providing an unprinted base paper, printing the decoration onto the base paper, detecting deviations of extension of the printed decoration by providing the printed decorative paper on a sample table, projecting a target pattern onto the sample table and the printed decorative paper such that a distance between two predetermined pattern elements of a projected target pattern corresponds to a target distance between at least two predetermined decorative elements of the decoration, and determining deviations between an actual distance of the decorative elements and the distance between the projected pattern elements, wherein the projected pattern elements comprise lines, which are visible in the projection, determining at least one corrective measure if the detected deviation is greater than a predetermined limit value, and implementing the at least one corrective measure and repeating the steps in the method.

2. The method according to claim 1, wherein a target distance corresponds to a target width of the decoration and/or a target distance to a length of the decoration.

3. The method according to claim 1, wherein a target distance corresponds to a distance of two lines of the decoration.

4. The method according to claim 1, wherein pattern elements contain lines that are projected onto the decorative paper as light lines.

5. The method according to claim 1, wherein the target pattern contains at least one part of the decoration.

6. A method for processing a printed decorative paper, the method comprising:

providing a decorative paper onto which a decoration is printed, detecting deviations of extension of the printed decoration providing the printed decorative paper on a sample table, projecting a target pattern onto the sample table and the printed decorative paper such that a distance between two predetermined pattern elements of a projected target pattern corresponds to a target distance between at least two predetermined decorative elements of the decoration, and determining deviations between an actual distance of the decorative elements and the distance between the projected pattern elements, wherein the projected pattern elements comprise lines, which are visible in the projection, processing the printed decorative paper in at least one further work step, depending on the detected deviations of extension.

7. The method according to claim 6, wherein the at least one further work step is selected depending on the detected deviations and/or that working parameters in the work step are selected depending on the detected deviations.

8. The device for carrying out a method according to claim 1, the device comprising the sample table and at least one projector for projecting the target pattern onto the sample table.

9. The device according to claim 8, wherein the device comprises at least one optical sensor which is configured to detect a target pattern projected onto the sample table and at least one part of the decoration of a decorative paper on the sample table.

10. The device according to claim 9, wherein the device comprises an electric control unit which is configured to evaluate data from the at least one optical sensor and to determine the deviations.

11. The device according to claim 10, wherein the electric control unit is configured to emit a signal when the determined deviations exceed a predetermined dimension.

12. The device according to claim 10, wherein the electric control unit is configured to display the determined deviations on a display device, to store them in an electronic memory and/or to transmit them to another electric control unit.

13. The device according to claim 8, wherein the at least one projector is arranged in such a way that it projects the target template in a direction perpendicular to the sample table.

14. The device according to claim 8, wherein the at least one projector is arranged such that it can be displaced relative to the sample table.

15. The device according to claim 5, wherein the target pattern contains at least one part of an entire decoration.

16. The device according to claim 9, wherein the at least one optical sensor comprises at least one camera.

17. The device according to claim 10, wherein the electric control unit comprises an electronic data processing device which is configured to evaluate data from a camera.

18. The device according to claim 11, wherein the electric control unit is configured to emit an optical and/or acoustic signal.

19. The device according to claim 14, wherein the at least one projector is arranged such that it can be displaced perpendicular to the sample table.

* * * * *